April 26, 1960 E. W. PATTERSON 2,934,169
PISTON LUBRICATING MEANS
Filed Jan. 29, 1957

EDGAR W. PATTERSON
INVENTOR.
BY
ATTORNEY

United States Patent Office 2,934,169
Patented Apr. 26, 1960

2,934,169

PISTON LUBRICATING MEANS

Edgar W. Patterson, Downey, Calif.

Application January 29, 1957, Serial No. 637,037

16 Claims. (Cl. 184—18)

My present invention relates to pistons within cylinders and means for effectively lubricating and sealing pistons relative to the cylinder bore, and relates particularly to piston lubricating means which requires only occasional attention and replenishing with lubricant.

The present invention is specifically adapted and is of great importance in connection with air-balanced oil well pumping units of the general type as that shown in my Patent No. 2,464,710, issued March 15, 1949, and in various other types of air cylinders.

My present invention is an improvement in my Patent No. 2,665,774, issued January 12, 1954, which also relates to piston lubricating means.

In prior art piston lubricating constructions, the lubricant had to be either continuously or very frequently replenished at the piston. This required either the constant or the frequent attention of an operator, and if the lubricant was not replenished in sufficient time, great damage could occur to the structure.

It is therefore an object of my present invention to provide piston lubricating means in which the piston has a self-contained supply of lubricant and in which this lubricant need be replenished only occasionally.

Another problem in the prior art is that in all arrangements whereby the cylinder is fitted with a partial head or cover at the lower end thereof, there must consequently be a continuous displacement of air both into and out of the lower or atmospheric pressure end of the cylinder. This condition holds true as regards my above mentioned Patent No. 2,464,710, issued March 15, 1949, and all similar arrangements. The continuous taking in of new air at each stroke of the cylinder will, under certain operating conditions, give trouble and cause unnecessary wear on the piston, rings, and cylinder walls, when the machine is operating in the open oil fields where there is considerable dust and sand present in the atmosphere. As a matter of fact, the oil contained in the annulus acts as a trap for dust entering the chamber, and consequently there is a continuous accumulating of dust and foreign matter within the oil supply reservoir at all times.

It is therefore another object of my present invention to provide a cylinder, piston, and means for lubricating same, wherein there will be no displacement of air below the piston within the cylinder, and to provide an oil reservoir that is not subject to contamination from the atmosphere.

Other objects and advantages of my present invention will be apparent from the following description and claims, the novelty consisting of the features of construction, combinations of parts, the novel relations of the members and the relative proportioning, disposition, and operation thereof, all as is more completely outlined herein and particularly pointed out in the appended claims.

In my accompanying drawings, forming a part of my present specification:

Figures 1, 2, 3, 4:
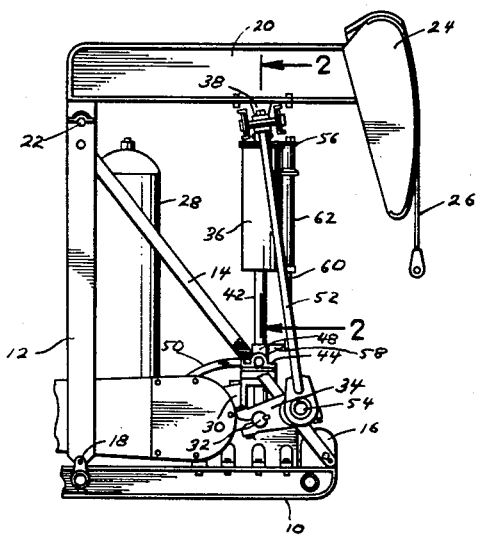
Figure 1 is a side-elevation view, with prime mover broken away, of an air-balanced pumping unit embodying my present invention.
Figure 2 is an enlarged axial vertical section view taken along the line 2—2 of Figure 1.
Figure 3 is an enlarged horizontal section view taken along the line 3—3 of Figure 2.
Figure 4 is an enlarged vertical section view showing the details of construction on the lower portion of the piston shown in Figure 2.

Referring to my drawings, and at first particularly to Figure 1 thereof, I provide a pumping unit supported jointly by a generally horizontal base 10, and an identical pair of vertically positioned parallel members 12 which are disposed at opposite sides thereof. The individual members 12 are joined together by suitable bracing to form what is known as a Samson post, which is maintained in its vertical position by means of a pair of angular struts or braces 14. These braces have their ends secured respectively near the top of the upright members 12 and adjacent to the horizontal base 10, and are affixed at the latter point to a geared "set back" crank mechanism 16. The lower end of the Samson post 12 is in turn attached to the main base 10 by suitable hinge pins 18.

The conventional walking beam 20 is pivotally secured at one end to the top of the Samson post 12 by means of a shaft 22 and carries at its opposite end a horse-head 24 over which the reins 26 attached to a pump rod will operate.

An air receiver or tank 28 is located adjacent the Samson post upon the main base 10. Rotatably journaled in a conventional gear unit 30 is a low speed main drive shaft 32, to each end of which is fixed a crank 34, one at each side of the gear unit. The shaft 32 is suitably connected to a power unit by suitable conventional driving means not shown in detail.

A cylindrical air-balance cylinder 36 is pivotally supported at its top by a universal mounting from a cross-head assembly 38 affixed to the under side of the walking beam 20, the balance cylinder being thus adapted to reciprocate vertically over a vertically stationary piston 40 supported within the cylinder 36 by means of a vertically disposed tubular piston rod member 42, which in turn is pivotally mounted at its lower end in bearings 44 carried upon the base 10. The upper end of the hollow piston rod 42 communicates with the compression space 46 above the piston 40 within the cylinder 36, and the lower end of the hollow piston rod 42 communicates with the air receiver 28 through the pivotal base 48 and the air duct 50.

A pair of vertically swinging pitman rods 52 are pivotally secured to cross-head member 38 at their upper ends, and are attached by a journaled crank pin 54 to the crank arms 34 at their lower ends.

Fixedly secured to the piston rod member 42 is a suitable mounting bracket 58 upon which is mounted the piston rod 60 of an air compressor 62, which in turn is attached to the main cylinder head 56 and adapted to reciprocate simultaneously with the main balance cylinder for use as a source of supply for compressed air during normal operation of the pumping unit.

As here illustrated, the main piston 40 is mounted upon the upper end of the hollow piston rod 42, and consists generally of a cylindrical casting, or fabricated member, which is divided into an upper reservoir 64 and a lower reservoir 66, the lower reservoir 66 being the primary reservoir in my present invention.

Some of the oil lubricating the cylinder wall will be captured in the upper reservoir 64, and this oil in reservoir 64 is adapted to lubricate and seal the piston 40 within the cylinder 36 by means of drilled holes 68 through the circumferential wall 70 of the piston 40 leading to an annular groove 72 therearound.

The upper part of piston 40 is fitted with suitable piston rings or packing rings 74, which are high pressure rings for withholding air or oil under pressure above the piston 40.

The lower part of the piston 40 is provided with a circumferential side wall 76 having grooves 78 into which are fitted piston rings 80 that are adapted to scrape oil from the cylinder wall 36 and cause such oil to be caught and held in the lower or primary reservoir 66. The primary reservoir 66 comprises an annular gap or open space 82 immediately below the upper part of piston 40 and above the lower part thereof. This gap or annulus will permit air under pressure that may bypass the compression rings 74 to expand to atmospheric pressure and escape to the atmospheric by means of vent tube 84 through the lower head of piston 40.

In order to permit oil to be periodically supplied to the reservoir 66, I provide an oil filler tube 86 which extends downwardly from annular gap of reservoir 66 through the lower head of piston 40 and along piston rod 42 to the lower portion of piston rod 42, where the oil filler tube terminates in a suitable control valve 88 which may be selectively opened to admit oil through filler tube 86 into the reservoir 66 from a suitable oil source or supply (not shown). Test means (not shown) may also be selectively connected to oil filler tube 86 through valve 88 in order to test the oil in the lower or primary reservoir 66 formed by the reservoir 66.

Figure 4 shows in detail my presently preferred piston construction for scraping oil from the wall of cylinder 36 and causing it to be trapped and held in the lower or primary reservoir 66. Figure 4 also shows in detail the manner in which my vent tube 84 and oil filler tube 86 pass through the lower head of piston 40.

In order to establish the level of the accumulated lubricant within the upper chamber or reservoir 64, and to prevent too much lubricant from being maintained above the piston, I provide a central vertical tube 90 through which excess lubricant will drain from upper reservoir 64.

The cycle of operation of the present piston lubricating and sealing apparatus is predicated upon the assumption that any oil that has been placed in reservoir 66 will be entrapped and held in the lower reservoir 66, without any appreciable escapement of oil externally of the system, or contamination from the atmosphere.

In operation of the present invention it will be understood that the cylinder 36 is held to the cross-head 38 by some suitable pivotal means, such for example as a bolt receiving bore 92 formed in ear means mounted on the closed end of cylinder 36. The cylinder 36 can oscillate as it reciprocates upon the oscillating piston 40. The lower or primary reservoir 66 of the piston 40 may then be filled to a desired level with lubricating oil through oil filler tube 86 and control valve 88, with the limit of this level being determined by the vent tube 84.

As the pumping unit operates the piston 40 will reciprocate within the cylinder 36 and at that time lubricating oil in the annulus 66 will lubricate the cylinder 36. The piston rings 80 will tend to prevent leakage of lubricating oil.

Attention is directed to the fact that the primary reservoir 66 is at atmospheric pressure so that the lubricating oil will be free to flow along the walls of the cylinder. The rings 80 in the circumferential side wall 76 of the lower head of piston 40 will tend to scrape off the excess oil and divert it inwardly to the lower or primary reservoir 66.

It will thus be seen that by my present invention it is possible to periodically test and replenish the lubricating oil in the piston, and that otherwise the lubricating system is self-contained in the piston. The lubricating oil is retained in its operative position relative to the piston and cylinder for a sufficient length of time and with only such a small amount of leakage that it is not necessary to check and replenish the oil in the system any more frequently than about every thirty days. Thus, my present system does not depend in any way upon frequent or continuous supervision by an operator, and thus saves a large amount of work and supervision and eliminates the likelihood of damage to the system because of an inadvertent failure to replenish the oil at frequent intervals as was required in most prior art systems.

It is to be understood that the form of my invention herein shown and described is my preferred embodiment and that various changes in the shape, size and arrangement of parts may be resorted to without departing from the spirit of my invention, or the scope of the appended claims.

I claim:

1. In combination: a cylinder, a piston rod, a piston on said piston rod closely fitting and slideable reciprocably in said cylinder, said piston having a pressure sealing head portion, a lubricant reservoir in said piston below said pressure sealing head portion, a fluid communication between said reservoir and the space between said piston and said cylinder below said pressure sealing head portion to provide lubricant to the meeting surfaces of said piston and said cylinder, lubricant sealing means mounted on said piston below said communication to minimize the loss of lubricant from said reservoir, and selective means for supplying lubricant to said reservoir.

2. The device of claim 1 in which said lubricant supply means includes a lubricant supply conduit opening into said reservoir.

3. The device of claim 1 in which said lubricant supply means includes a lubricant supply conduit and a selectively operable control valve in said supply conduit.

4. The device of claim 1 in which said lubricant supply means includes a lubricant supply conduit one end of which passes through the lower portion of said piston and terminates within said reservoir.

5. The device of claim 1 in which said lubricant sealing means comprises an oil scraper ring.

6. In combination: a cylinder, a piston rod, a piston on said piston rod closely fitting and slideable reciprocably in said cylinder, a lubricant reservoir in said piston, a fluid communication between said reservoir and the space between said piston and cylinder to provide lubricant to the meeting surfaces of said piston and said cylinder, lubricant sealing means mounted on said piston below said communication to minimize the loss of lubricant from said reservoir, selective means for supplying lubricant to said reservoir, and a pressure relief passage connecting said reservoir with the air at atmospheric pressure below said lubricant sealing means.

7. The device of claim 6 in which said pressure relief passage connects the upper part of said reservoir with the air at atmospheric pressure below said lubricant sealing means.

8. The device of claim 6 in which said pressure relief passage is provided by a conduit which passes through the lower portion of said piston and terminates at one end in the upper portion of said reservoir and at the other end in the atmospheric pressure region below said lubricant sealing means.

9. In combination: a cylinder, a piston rod, a piston on said piston rod closely fitting and slideable reciprocably in said cylinder, an annular recess in the cylindrical wall of said piston forming a lubricant reservoir in said piston, lubricant sealing means mounted on said piston below said annular recess to minimize the loss of lubricant from said annular recess, selective means for supplying lubricant to said annular recess, and pressure relief, passage means connecting said annular recess with the air at atmospheric pressure below said lubricant sealing means.

10. The device of claim 9 in which said lubricant supply means includes a lubricant supply conduit passing through the lower portion of said piston below said annular recess.

11. The device of claim 9 in which said pressure relief passage means includes a conduit passing through the lower portion of said piston below said annular recess, said conduit terminating at one end in the upper portion of said annular recess and at the other end below said lubricant sealing means on said piston.

12. The device of claim 9 in which said lubricant supply means includes a lubricant supply conduit passing through the lower portion of said piston below said annular recess, and in which said pressure relief passage means includes a conduit passing through the lower portion of said piston below said annular recess, said pressure relief conduit terminating at one end in the upper portion of said annular recess and at the other end below said lubricant sealing means on said piston.

13. The device of claim 9 in which said lubricant supply means includes a lubricant supply conduit passing through the lower portion of said piston below said annular recess and a selectively operable control valve in said supply conduit, and in which said pressure relief passage means includes a conduit passing through the lower portion of said piston below said annular recess, said pressure relief conduit terminating at one end in the upper portion of said annular recess and at the other end below said lubricant sealing means on said piston.

14. In an air balance, the combination of a cylinder, one end of which is closed and the other end of which is open, a piston rod, a piston on said piston rod and adapted to slide within said cylinder with the latter in substantially upright position with its open end disposed downwardly, said air balance being adapted to operate with said cylinder and piston thus disposed so as to result in sliding reciprocatory vertical relative movement between said cylinder and piston, means for admitting air under high pressure to the interior of said cylinder above said piston, a lubricant reservoir in said piston, a fluid communication between said reservoir and the space between said piston and cylinder to provide lubricant to the meeting surfaces of said piston and cylinder, air pressure sealing means mounted on said piston above said communication, lubricant sealing means mounted on said piston below said communication to minimize the loss of lubricant from said reservoir, and pressure relief passage means connecting said reservoir with the air at atmospheric pressure below said lubricant sealing means.

15. The device of claim 14 in which said reservoir and fluid communication comprise an annular recess in the cylindrical wall of said piston.

16. The device of claim 14 in which a second fluid reservoir is disposed in said piston above said first mentioned reservoir, and a fluid passage from said second reservoir to the meeting faces of said piston and cylinder above said air pressure sealing means.

References Cited in the file of this patent

UNITED STATES PATENTS

| | | |
|---|---|---|
| 198,391 | Jamieson | Dec. 18, 1877 |
| 2,486,705 | Corey | Nov. 1, 1949 |
| 2,665,774 | Patterson | Jan. 12, 1954 |